(12) United States Patent
Wang

(10) Patent No.: US 9,791,134 B2
(45) Date of Patent: Oct. 17, 2017

(54) PRESS FIXTURE

(71) Applicants: BOE TECHNOLOGY GROUP CO., LTD., Beijing (CN); HEFEI BOE DISPLAY LIGHT CO., LTD., Hefei, Anhui (CN)

(72) Inventor: Xiaolei Wang, Beijing (CN)

(73) Assignees: BOE TECHNOLOGY GROUP CO., LTD., Beijing (CN); HEFEI BOE DISPLAY LIGHT CO., LTD., Hefei, Anhui (CN)

( * ) Notice: Subject to any disclaimer, the term of this patent is extended or adjusted under 35 U.S.C. 154(b) by 386 days.

(21) Appl. No.: 14/363,172

(22) PCT Filed: Apr. 28, 2013

(86) PCT No.: PCT/CN2013/074965
§ 371 (c)(1),
(2) Date: Jun. 5, 2014

(87) PCT Pub. No.: WO2014/146327
PCT Pub. Date: Sep. 25, 2014

(65) Prior Publication Data
US 2016/0116142 A1 Apr. 28, 2016

(30) Foreign Application Priority Data
Mar. 19, 2013 (CN) .......................... 2013 1 0086957

(51) Int. Cl.
*B30B 9/00* (2006.01)
*F21V 17/04* (2006.01)
(Continued)

(52) U.S. Cl.
CPC .............. *F21V 17/04* (2013.01); *B30B 9/047* (2013.01); *G02F 1/1303* (2013.01); *G02F 1/133615* (2013.01)

(58) Field of Classification Search
CPC ....... B21D 24/14; B25B 27/026; B29C 65/56; B30B 1/38; B30B 15/285; B30B 15/287; B30B 15/288
(Continued)

(56) References Cited

U.S. PATENT DOCUMENTS 3,109,927 A * 11/1963 Lesnett, Jr. ............... B07C 5/10
235/132 R
3,481,268 A * 12/1969 Szilagyi ............... B30B 9/3007
100/127
(Continued)

FOREIGN PATENT DOCUMENTS

CN            1873304 A     12/2006
CN        101797594 A *   8/2010
(Continued)

OTHER PUBLICATIONS

Machine translation of CN 101797594 from Espacenet. Dated Apr. 4, 2016.*

(Continued)

*Primary Examiner* — Larry E Waggle, Jr.
*Assistant Examiner* — Tyrone V Hall, Jr.
(74) *Attorney, Agent, or Firm* — Ladas & Parry LLP

(57) ABSTRACT

The embodiment of present invention discloses a press fixture, including: a carrier board; a power unit and a pressing unit attached on the carrier board and arranged at a certain distance with each other; a retractable unit and a pushing block, one end of the retractable unit being fixedly connected to the power unit and the other end of the retractable unit being fixedly connected to the pushing block. The power unit drives the retractable unit to retract, so that the retractable unit brings the pushing block to move between the power unit and the pressing unit, for pressing the first piece to be pressed and the second piece to be (Continued)

pressed located between the pushing block and the pressing unit. The press fixture according to the embodiment of present invention reduces the work force and the work intensity of the operators.

6 Claims, 5 Drawing Sheets

(51) Int. Cl.
*B30B 9/04* (2006.01)
*G02F 1/13* (2006.01)
*G02F 1/1335* (2006.01)

(58) Field of Classification Search
USPC .............................. 100/215, 269.01, 348, 353
See application file for complete search history.

(56) References Cited

U.S. PATENT DOCUMENTS

| | | | | |
|---|---|---|---|---|
| 3,501,890 A * | 3/1970 | Hunt | ............... | B65B 1/24 100/188 R |
| 3,613,556 A * | 10/1971 | Wright | ............... | B30B 9/30 100/14 |
| 3,619,629 A * | 11/1971 | Matthews | ............... | G08B 13/183 250/221 |
| 3,762,310 A * | 10/1973 | Wright | ............... | B65B 13/20 100/3 |
| 3,889,586 A * | 6/1975 | Pretty | ............... | B30B 15/16 100/229 R |
| 3,919,546 A * | 11/1975 | Lutus | ............... | G01D 3/032 250/205 |
| 3,965,355 A * | 6/1976 | Maccabee | ............... | G08B 13/184 250/338.1 |
| 4,939,358 A * | 7/1990 | Herman | ............... | F16P 3/14 250/221 |
| 5,006,197 A * | 4/1991 | Newkirk | ............... | B29C 65/2015 156/250 |
| 5,271,321 A * | 12/1993 | Nordberg | ............... | B30B 9/30 100/214 |
| 5,735,201 A * | 4/1998 | Hirao | ............... | B21D 24/12 100/269.01 |
| 6,055,902 A * | 5/2000 | Harrop | ............... | B30B 9/3007 100/229 A |
| 6,114,690 A * | 9/2000 | Oei | ............... | B21J 13/00 250/221 |
| 7,454,935 B2 * | 11/2008 | Braune | ............... | F16P 3/14 100/348 |
| 2002/0134256 A1* | 9/2002 | Futamura | ............... | B30B 1/323 100/269.01 |
| 2003/0084794 A1* | 5/2003 | Koyama | ............... | B30B 15/16 100/269.01 |
| 2010/0089255 A1* | 4/2010 | Shimao | ............... | B29C 43/36 100/35 |
| 2012/0186468 A1* | 7/2012 | Yang | ............... | B30B 1/38 100/102 |

FOREIGN PATENT DOCUMENTS

| | | | | |
|---|---|---|---|---|
| CN | 201922617 A | | 8/2011 | |
| FR | 2704802 A1 * | | 11/1994 | ............ B29C 45/68 |
| GB | 2015773 A * | | 9/1979 | ............ B21D 28/20 |
| JP | 02165898 A * | | 6/1990 | |

OTHER PUBLICATIONS

First Chinese Office Action dated Sep. 3, 2014; Appln. No. 201310086957.8.
International Search Report Issued Oct. 3, 2013; Appln. No. PCT/CN2013-074965.
International Preliminary Report on Parentability Appln. No. PCT/CN2013/074965; Dated Sep. 22, 2015.

* cited by examiner

PRESS FIXTURE

TECHNICAL FIELD

The embodiment of present invention relates to a press fixture.

BACKGROUND

During the manufacture of the backlight source for the liquid crystal display device, as shown in FIG. 1, it is required to press the lamp shade 10 and the light bar 2 of the backlight source together, wherein the light bar 2 comprises a mounting strip 21 and a LED light source 22 fixed thereon. The method for pressing the lamp shade 10 and the light bar 2 of the backlight source together in prior art is as follows. Firstly, the light bar 2 and the lamp shade 10 are attached together through double side tape; then, the operator pushes the light bar pressing piece to press the light bar 2 and the lamp shade 10 together; after that a tight bonding is created between the light bar 2 and the lamp shade 20. The disadvantages of such manners are in that the effect of the bonding between the light bar 2 and the lamp shade 10 depends too much upon the capability, experience and physical strength of the operators, and the operators are subjected to great intensity of work.

The above problems exist not only in pressing the lamp shade and the light bar of the backlight source together, but also, in the field of mechanical manufacturing for pressing the above two parts.

SUMMARY

The embodiment of present invention provides a press fixture for pressing the first piece to be pressed and the second piece to be pressed, which reduces the work force and the work intensity of the operators.

The embodiment of present invention provides a press fixture, comprising: a carrier board, a power unit and a pressing unit attached on the carrier board and arranged at a certain distance with each other; a retractable unit and a pushing block, one end of the retractable unit being fixedly connected to the power unit and the other end of the retractable unit being fixedly connected to the pushing block; wherein the power unit drives the retractable unit to retract so that the retractable unit brings the pushing block to move between the power unit and the pressing unit, for pressing the first piece to be pressed and the second piece to be pressed located between the pushing block and the pressing unit.

For example, in another embodiment of the present invention, a side of the power unit opposite to the pressing unit is evenly provided with several retractable units.

For example, in another embodiment of the present invention, the press fixture may further comprise a sensing unit and a power control unit; the sensing unit comprises a transmitter module and a receiver module, the transmitter module is embedded into the carrier board between the power unit and the pressing unit, and the receiver module is connected with the power unit and is arranged opposite to the transmitter module; the receiver module receives the signal from the transmitter module when the retractable unit retracts to expose the transmitter module; the receiver module is in communication with the power control unit, and the power control unit is in communication with the power unit.

For example, in another embodiment of the present invention, the pressing unit may comprise a pressing module and a yielding module, and when the retractable unit extends to press the first and second pieces to be pressed, the pressing module of the pressing unit and the second piece to be pressed are pressed together, and a gap is formed between the yielding module of the pressing unit and the first piece to be pressed.

For example, in another embodiment of the present invention, the pressing module comprises a pressing area and a non-pressing area such that, while the pressing module is used for pressing the second piece to be pressed comprising a pressable portion and a non-pressable portion, when the retractable unit extends to press the first and second pieces to be pressed, the pressing area of the pressing module and the pressable portion of the second piece to be pressed are pressed against each other, and the non-pressing area of the pressing module and the non-pressable portion of the second piece to be pressed have a gap therebetween.

For example, in another embodiment of the present invention, the press fixture may further comprise a positioning post which, upon placement of the first piece to be pressed and the second piece to be pressed, aligns the pressing area of the pressing module with the pressable portion of the second piece to be pressed, and aligns the non-pressing area of the pressing module with the non-pressable portion of the second piece to be pressed.

For example, in another embodiment of the present invention, the pressing module and the yielding module are fixed onto the carrier board with screws and screw holes.

For example, in another embodiment of the present invention, the press fixture may further comprise a cushion unit provided on one a side of the yielding module opposite to the pushing block.

For example, in another embodiment of the present invention, the power unit comprises a plurality of rod receiving holes at a side thereof opposite to the pressing unit, the retractable unit comprises a plurality of rods; the rods retract into the rod receiving holes.

For example, in another embodiment of the present invention, the retractable unit comprises a plurality of retractable rods.

The embodiment of present invention provides a press fixture, wherein, one end of the retractable unit being fixedly connected to the power unit and the other end of the retractable unit being fixedly connected to the pushing block; the power unit drives the retractable unit to retract so that the retractable unit brings the pushing block to move between the power unit and the pressing unit, thereby pressing the first piece to be pressed and the second piece to be pressed. As such, the first piece to be pressed and the second piece to be pressed, located between the pushing block and the pressing unit, are pressed together by the processes of the power unit driving the retractable unit to retract, and the retractable unit in turn bringing the pushing block to move. The press fixture according to the embodiment of present invention reduces the work force and the work intensity of the operators.

BRIEF DESCRIPTION OF THE DRAWINGS

In the following, a brief introduction of the drawings of the embodiment of present invention will be given so as to describe the technical solutions of the embodiments more clearly, and its obvious that the drawings described hereinafter just concern some embodiments of the present invention, rather than limitation to the present invention.

DETAILED DESCRIPTION

A clear and complete description of the technical solutions in the embodiment of present invention will be made in conjunction with the drawings of the embodiment of present invention, and obviously, the described embodiments are only part of the embodiments for the present invention, rather than all the embodiments. Based on the described embodiments of present invention, all the other embodiments achieved by the ordinary skilled in this art without any creative work belong to the protective scope of the present invention.

Unless defined otherwise, the technical terms or scientific terminology being used should take the meaning usually understood by the ordinary skilled in this art of present invention. The "first", "second" and similar words used in the description and claims of the present application does not denote any sequence, quantity or importance, but are used for distinguishing different components. Also, "one" or "a(an)" and similar words do not mean quantitative restriction, but refer to the presence of at least one. Wording "including" or "comprising" and similar words means that element elements or articles before this word encompass the elements or articles and their equivalents listed after this word, rather than excluding other elements or articles. "Coupling" or "coupled with" and the similar words are not limited to physical or mechanical connections, but may comprise electrical connection, no matter directly or indirectly. "Upper", "lower", "left", "right" and similar words are only used for representing a relative positional relationship, when the described object has changed its absolute position, this relative positional relationship may also vary accordingly.

Figure 1:
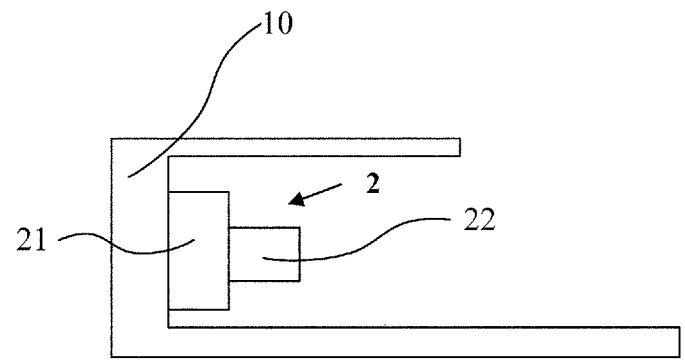
FIG. 1 illustrates a side view when the lamp shade and the light bar are pressed together.
Figure 2:
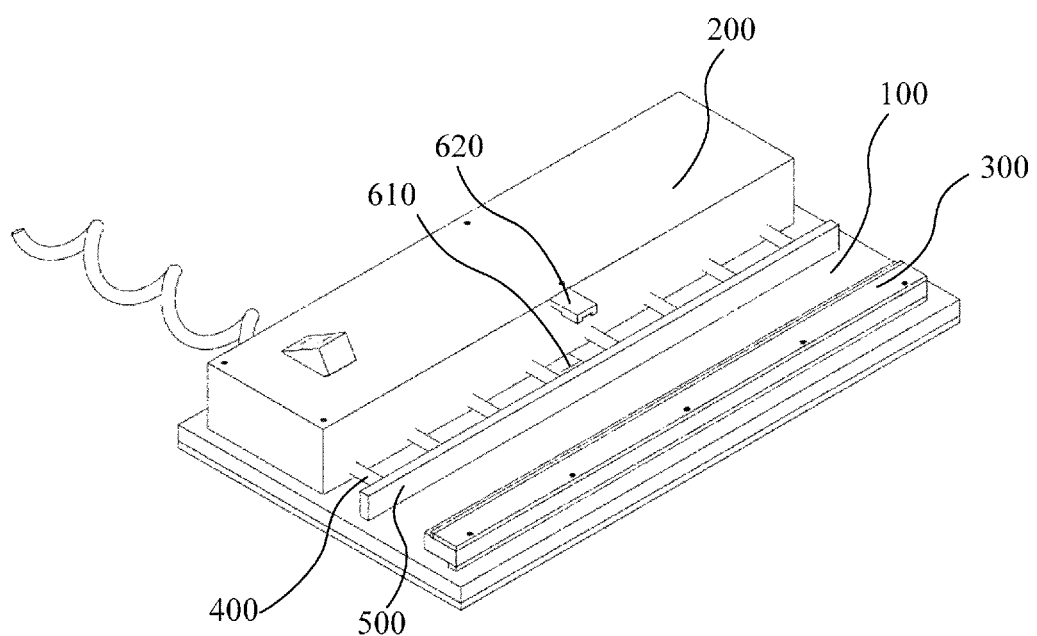
FIG. 2 illustrates a schematic view of the press fixture according to one embodiment of the present invention.

FIG. 2 illustrates a press fixture according to the first embodiment of the present invention, which comprises: a carrier board 100, a power unit 200 and a pressing unit 300 fixed on the carrier board and arranged at a certain distance with respect to each other; a retractable unit 400 and a pushing block 500, one end of the retractable unit 400 being fixedly connected to the power unit 200 and the other end of the retractable unit 400 being fixedly connected to the pushing block 500; the power unit 200 can drive the retractable unit 400 to retract, so that the retractable unit 400 brings the pushing block 500 to move between the power unit 200 and the pressing unit 300, thereby pressing the first piece to be pressed and the second piece to be pressed located between the pushing block 500 and the pressing unit 300.

In the press fixture of this embodiment, one end of the retractable unit 400 is fixedly connected to the power unit 200 and the other end of the retractable unit 400 is fixedly connected to the pushing block 500; the power unit 200 can drive the retractable unit 400 to retract, so that the retractable unit 400 brings the pushing block 500 to move between the power unit 200 and the pressing unit 300, thereby the first piece to be pressed and the second piece to be pressed are pressed between the pushing block 500 and the pressing unit 300. As such, it's possible to press the first piece to be pressed and the second piece to be pressed between the pushing block 500 and the pressing unit 300 by the power unit 200 driving the retractable unit 400 to retract, and the retractable unit 400 in turn bringing the pushing block 500 to move. Therefore, the present invention allows for reducing work force and thus reducing work intensity of the operators.

With reference to the drawings, a press fixture, which presses the lamp shade 10 (as an example of the first piece to be pressed) and the light bar (as an example of the second piece to be pressed) together, is described as an example. The pressing unit 300 and the pushing block 500 are shaped to match with the lamp shade and the light bar. To be specified, the shapes of the pressing unit 300 and the pushing block 500 are not limited to those shown in the drawings, as long as the first piece to be pressed and the second piece to be pressed can be pressed together.

The press fixture of the second embodiment of the present invention is further described on the basis of the first embodiment.

As shown in FIG. 2, one side of the power unit 200 opposited to the pressing unit 300 is evenly provided with several retractable units 400. In this way, the first and second pieces to be pressed are under evenly distributed pressures when they are pressed together.

The press fixture of the third embodiment of the present invention is described on the basis of the first and second embodiments.

Figure 3:
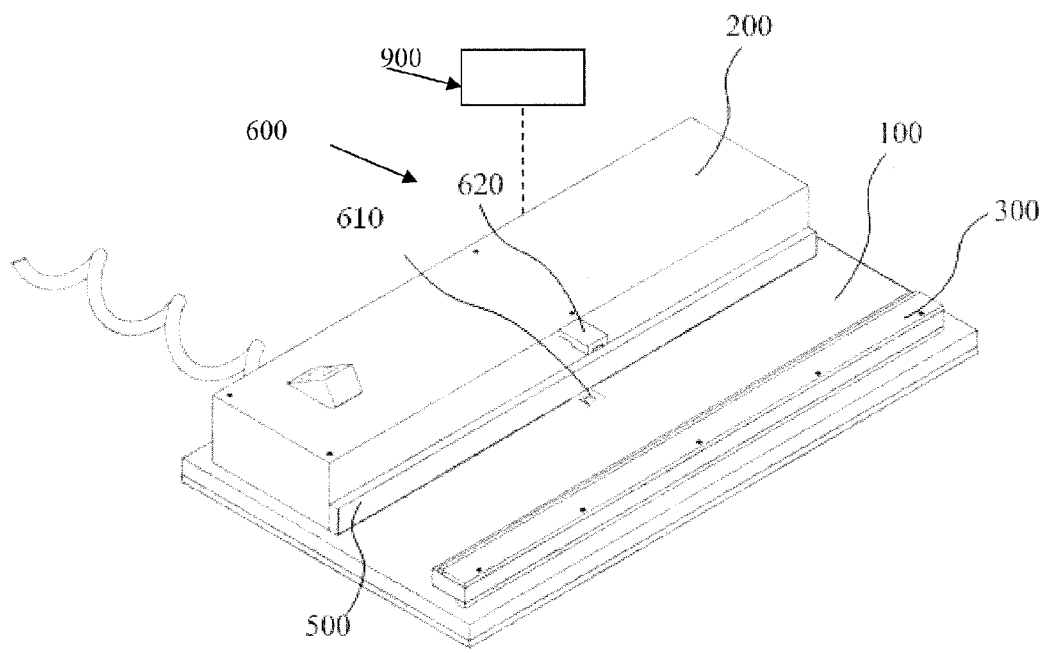
FIG. 3 is a schematic view of the press fixture shown in FIG. 2 when the retractable unit is retracted so as to expose the transmitter module.

As shown in FIGS. 2 and 3, FIG. 3 is a schematic view of the press fixture shown in FIG. 2, wherein the retractable unit 400 is retracted so as to expose the transmitter module.

The press fixture further comprises a sensing unit 600 and a power control unit 900; the sensing unit 600 comprises a transmitter module 610 and a receiver module 620, the transmitter module 610 is embedded into the carrier board 100 between the power unit 200 and the pressing unit 300, and the receiver module 620 is connected with the power unit 200 and is arranged opposite to the transmitter module 610; the receiver module 620 receives the signal transmitted from the transmitter module 610 when the retractable unit 400 retracts to expose the transmitter module; the receiver module 620 is in communication with the power control unit 900, and the power control unit 900 is in communication with the power unit 200. The receiver module 620 receives signal transmitted from the transmitter module 610 when the retractable unit 400 retracts to expose the transmitter module; then, the power control unit 900 receives signal transmitted from the receiver module 620, without the necessity of actuating the power unit 200.

Figure 4:
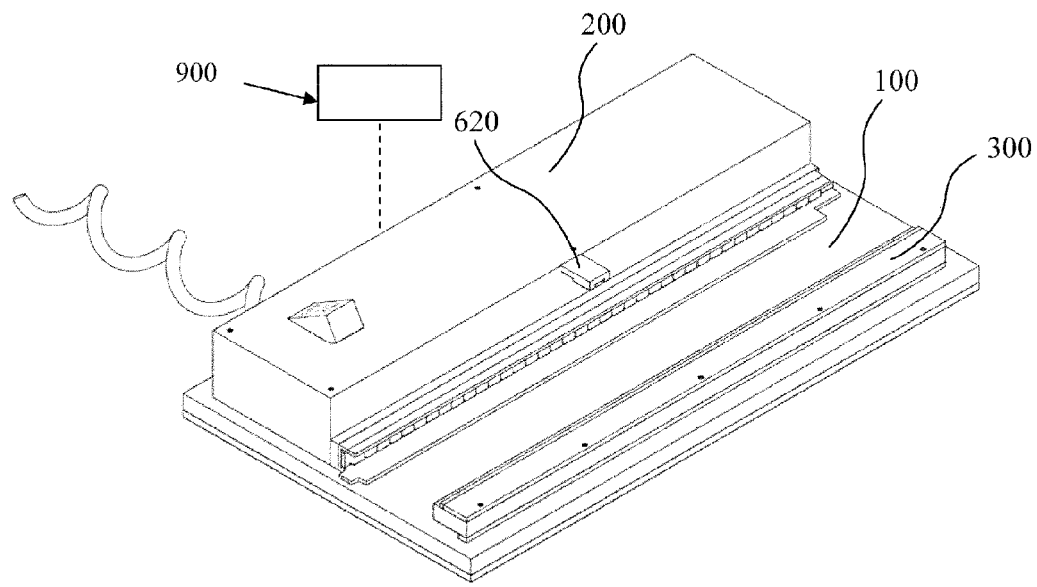
FIG. 4 is a schematic view of the press fixture shown in FIG. 3 when the first piece to be pressed and the second piece to be pressed are placed.

As shown in FIG. 4, a schematic view illustrates the press fixture shown in FIG. 3 when the first piece to be pressed and the second piece to be pressed are placed therein. When the first piece to be pressed and the second piece to be pressed block the transmitter module 610, the receiver module 620 cannot receive any signal from the transmitter module; then, the power control unit 900 receives signals from the receiver module 620, instructing the power control unit 900 to turn on the power unit 200; after that, the power unit 200 drives the retractable unit 400 to retract and extend, such that the retractable unit 400 brings the pushing block 500 to move between the power unit 200 and the pressing unit 300, and thus the first piece to be pressed and the second piece to be pressed, located between the pushing block 500 and the pressing unit 300, are pressed together. The power control unit 900 sets the time for the starting, returning, and stoprodg of the power unit 200 according to the parameters of the press fixture, and the dimensions of the first piece to be pressed and the second piece to be pressed.

In this way, the sensing unit 600, the power control unit 900, and the power unit 200 works together to realize semiautomatic pressing of the first piece to be pressed and the second piece to be pressed by the press fixture.

The press fixture of the fourth embodiment of the present invention is further described on the basis of the first, second and third embodiments.

Figure 5:
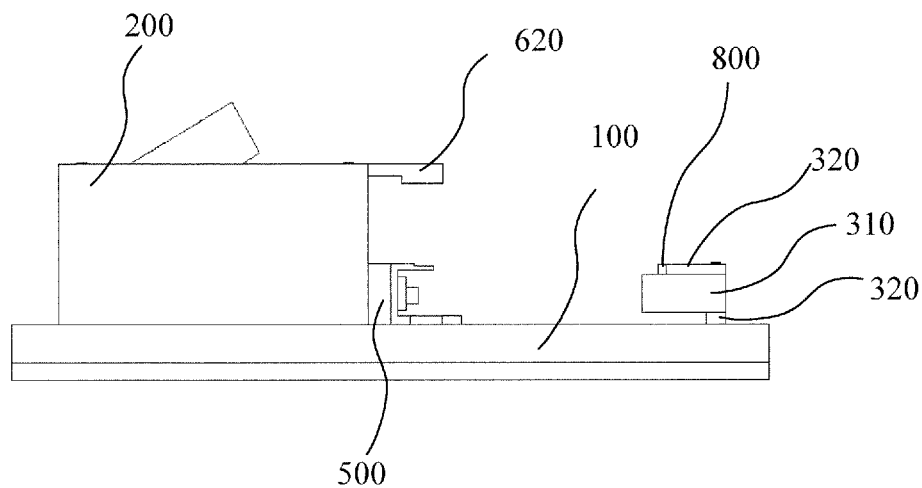
FIG. 5 is a schematic section view of the press fixture of FIG. 4, which places the first piece to be pressed and the second piece to be pressed, along the retracting direction of the retractable unit.
Figure 6:
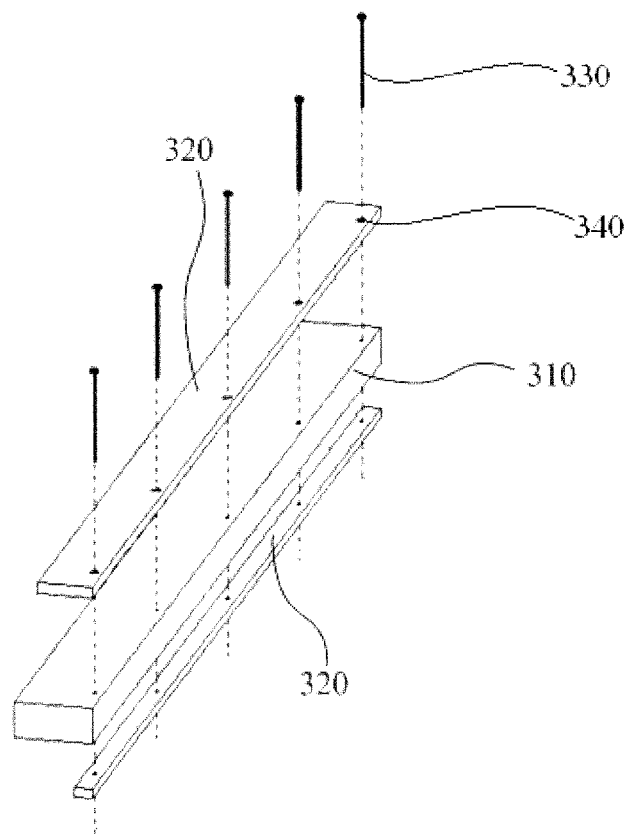
FIG. 6 is an explosive view showing the pressing unit of the press fixture shown in FIG. 4.

As shown in FIGS. 5 and 6, FIG. 5 is a schematic sectional view of the press fixture of FIG. 4 having the first piece to be pressed and the second piece to be pressed placed therein, and FIG. 6 is an explosive view of the pressing unit 300 of the press fixture shown in FIG. 4. The pressing unit 300 comprises a pressing module 310 and a yielding module 320.

Figure 7:
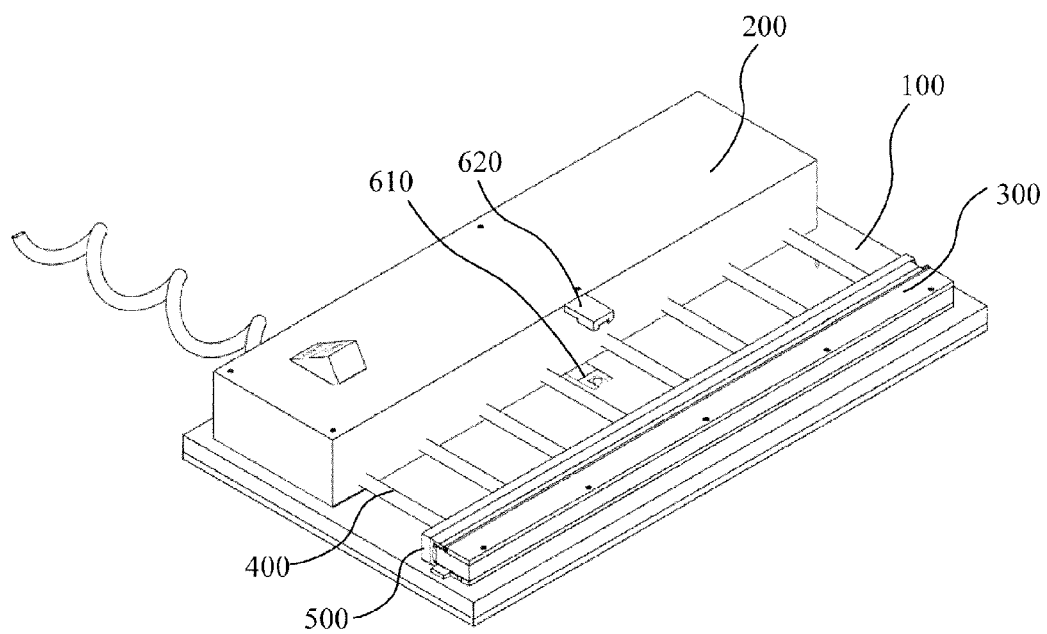
FIG. 7 is a schematic view of the press fixture shown in FIG. 5 when pressing the first piece to be pressed and the second piece to be pressed.

As shown in FIG. 7, a schematic view illustrates the press fixture shown in FIG. 5 when pressing the first piece to be pressed and the second piece to be pressed. When the retractable unit 400 extends to press the first and second pieces to be pressed, the pressing module 310 of the pressing unit 300 and the second piece to be pressed are pressed together, and the yielding module 320 of the pressing unit 300 and the first piece to be pressed have a gap therebetween. As such, while the first piece to be pressed and the second piece to be pressed are pressed together, its possible to prevent the yielding module 320 applying a force on the first piece to be pressed in a direction opposite to the pressing direction by. In addition, the pressing unit 300 comprises the pressing module 310 and the yielding module 320, which may be manufactured separately. Thus, comparing with the integral formed pressing unit in prior art, the manufacturing of the pressing unit 300 is easier and the cost is reduced.

The press fixture of the fifth embodiment of the present invention is further described on the basis of the fourth embodiment.

Figure 8:
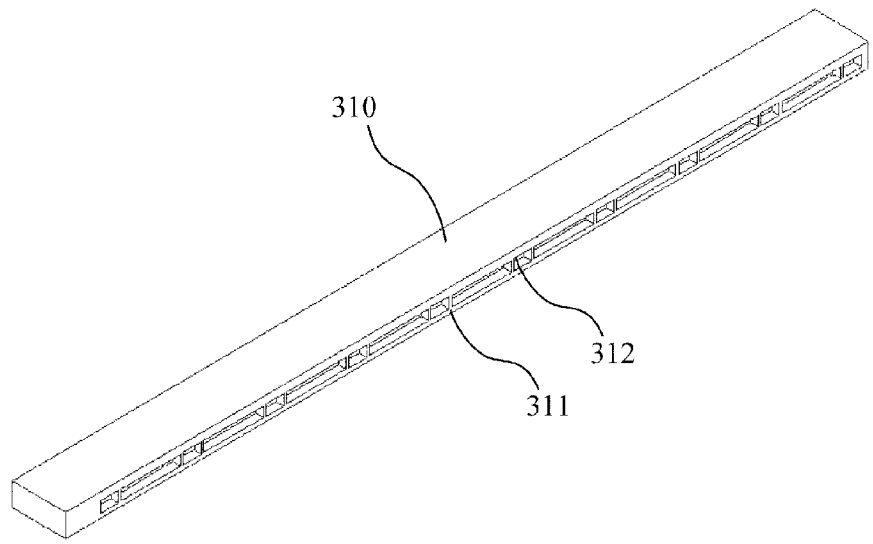
FIG. 8 is a schematic view showing the pressing module of the pressing unit in the press fixture according to another embodiment of the present invention.
Figure 9:
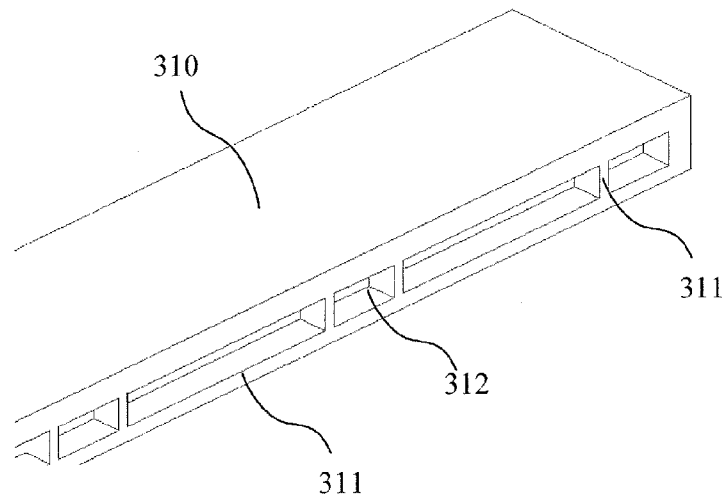
FIG. 9 is a close-up view of the pressing module shown in FIG. 8.

The second piece to be pressed comprises a pressable portion and a non-pressable portion. As shown in FIGS. 8 and 9, FIG. 8 is a schematic view illustrates the pressing module 310 of the pressing unit 300 of the press fixture according to an embodiment of the present invention, and FIG. 9 is a close-up view of the pressing module 310 shown in FIG. 8. The pressing module 310 comprises a pressing area 311 and a non-pressing area 312.

When the retractable unit 400 extends to press the first and second pieces to be pressed together, the pressing area 311 of the pressing module 310 and the pressable portion of the second piece to be pressed are pressed together, and the non-pressing area 312 of the pressing module and the non-pressable area of the second piece to be pressed have a gap therebetween. In an application, where the first piece to be pressed is a lamp shade 10 and the second piece to be pressed is a lamp strip, the pressable portion of the lamp strip is a mounting strip 21, the non-pressable portion of the lamp strip is an LED light source 22.

The press fixture of the sixth embodiment of the present invention is further described on the basis of the fifth embodiment.

Figure 10:
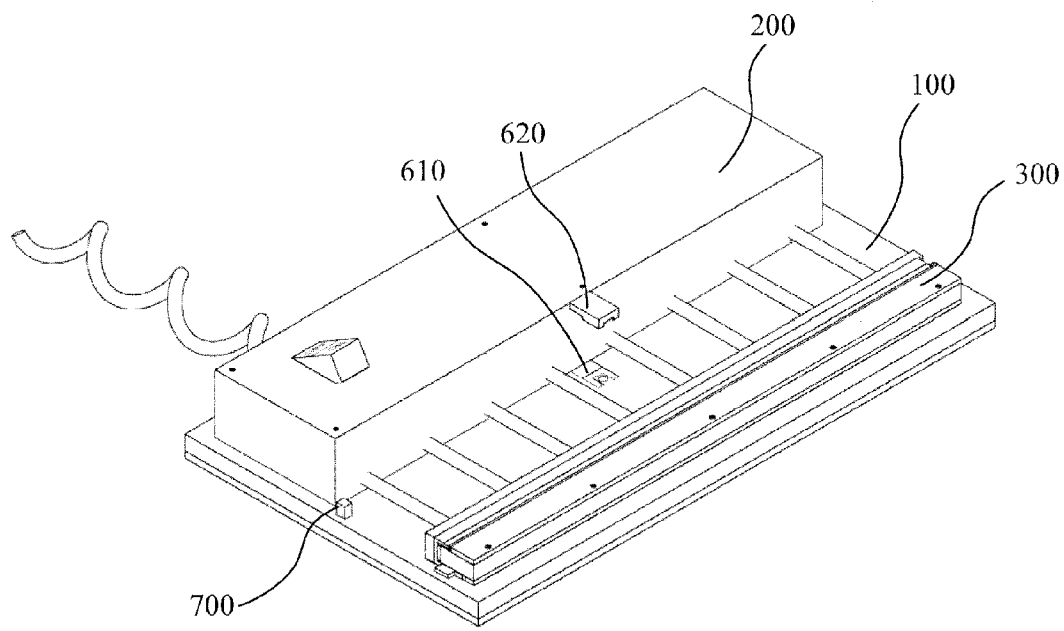
FIG. 10 is a schematic view of the press fixture according to still another embodiment of the present invention.

As shown in FIG. 10, FIG. 10 is a schematic view of the press fixture according to still another embodiment of the present invention. The press fixture further comprises a positioning post 700. The positioning post 700 is adapted to have one end of the piece to be pressed abut against the positioning post 700 before the pressing process. Then, when the first piece to be pressed and the second piece to be pressed are pressed together, the pressing area 311 of the pressing module 310 is right opposite to the pressable portion of the second piece to be pressed, and the non-pressing area 312 of the pressing module is right opposite to the non-pressable portion of the second piece to be pressed. As such, by arranging the position of the positioning post 700 suitably, its ensured that the pressing area of the pressing module 310 is pressed against the pressable portion of the second piece to be pressed, and there is a gap between the non-pressing area 312 of the pressing module and the non-pressable portion of the second piece to be pressed.

An exemplary means for attaching the pressing module 310 and the yielding module 320 of the seventh embodiment of the present invention is described based on the fourth, the fifth and the sixth embodiments.

The pressing module 310 and the yielding module 320 are fixed onto the carrier board with screws 330 and screw holes 340.

To be specified, the fixing means does not limited to the screws 330 and screw holes 340 in this embodiment, and any other suitable means may be adopted, as long as it is capable to attach the pressing module 310 and the yielding module 320 onto the carrier board. The above means is described only by way of example.

The press fixture of the eighth embodiment of the present invention is described on the basis of the fourth, fifth, sixth and seventh embodiments.

As shown in FIG. 5, the press fixture further comprises a cushion unit 800 arranged on a side of the yielding module opposite to the pushing block 500.

The press fixture of the ninth embodiment of the present invention is further described on the basis of any one of the above embodiments.

The power unit 200 comprises rod receiving holes at a side thereof opposite to the pressing unit 300, the retractable unit 400 comprises a plurality of rods; the rods could retract in the rod receiving holes.

The press fixture 400 of the tenth embodiment of the present invention is further described on the basis of the first to the eighth embodiments.

The retractable unit 400 comprises a plurality of retractable rods.

Apparently, various modification and alternation can be made to the embodiment of present invention by the skilled on in this art without departing from the spirit and scope of the present invention. Thereby, the present invention intends to encompass all such modification and alternation, provided they are within the scope of the claims of the present invention and its equivalents.

The invention claimed is:
1. A press fixture, comprising:
a carrier board, a power unit and a pressing unit attached on the carrier board and arranged at a certain distance with each other;

a retractable unit and a pushing block, one end of the retractable unit being fixedly connected to the power unit and another end of the retractable unit being fixedly connected to the pushing block;

wherein the power unit drives the retractable unit to retract so that the retractable unit brings the pushing block to move between the power unit and the pressing unit, for pressing a first piece to be pressed and a second piece to be pressed located between the pushing block and the pressing unit;

wherein the press fixture further comprising a sensing unit and a power control unit;

wherein the sensing unit comprises a transmitter module and a receiver module, the transmitter module is embedded into the carrier board between the power unit and the pressing unit, and the receiver module is connected with the power unit and is arranged opposite to the transmitter module;

the receiver module receives a signal from the transmitter module when the retractable unit retracts to expose the transmitter module;

the receiver module is in communication with the power control unit, and the power control unit is in communication with the power unit;

wherein the pressing unit comprises a pressing module and a yielding module, when the retractable unit extends to press the first and the second pieces to be pressed, the pressing module of the pressing unit and the second piece to be pressed are pressed together, and a gap is formed between the yielding module of the pressing unit and the first piece to be pressed;

wherein the pressing module comprises a pressing area and a non-pressing area such that, while the pressing module is used for pressing the second piece to be pressed comprising a pressable portion and a non-pressable portion, when the retractable unit extends to press the first and second pieces to be pressed, the pressing area of the pressing module and the pressable portion of the second piece to be pressed are pressed against each other, and the non-pressing area of the pressing module and the non-pressable portion of the second piece to be pressed have a gap formed therebetween;

wherein the press fixture further comprises a positioning post which, upon placement of the first piece to be pressed and the second piece to be pressed, aligns the pressing area of the pressing module with the pressable portion of the second piece to be pressed, and aligns the non-pressing area of the pressing module with the non-pressable portion of the second piece to be pressed.

2. The press fixture according to claim 1, wherein a side of the power unit opposite to the pressing unit is evenly provided with a plurality of retractable units.

3. The press fixture according to claim 1, wherein the pressing module and the yielding module are fixed onto the carrier board with screws and screw holes.

4. The press fixture according to claim 1, further comprising a cushion unit provided on a side of the yielding module opposite to the pushing block.

5. The press fixture according to claim 1, wherein the power unit comprises a plurality of rod receiving holes at a side thereof opposite to the pressing unit, the retractable unit comprises a plurality of rods;

the rods retract into the rod receiving holes.

6. The press fixture according to claim 1, wherein the retractable unit comprises a plurality of retractable rods.

* * * * *